(12) United States Patent
Day

(10) Patent No.: US 7,325,860 B2
(45) Date of Patent: Feb. 5, 2008

(54) RECREATIONAL VEHICLE WITH U-SHAPED SEATING AREA

(75) Inventor: Donald B. Day, Caldwell, ID (US)

(73) Assignee: Extreme RV's, LLC, Caldwell, ID (US)

( * ) Notice: Subject to any disclaimer, the term of this patent is extended or adjusted under 35 U.S.C. 154(b) by 0 days.

(21) Appl. No.: 11/479,647

(22) Filed: Jun. 30, 2006

(65) Prior Publication Data

US 2008/0001427 A1    Jan. 3, 2008

(51) Int. Cl.
*B60P 3/325* (2006.01)
*B60P 3/39* (2006.01)

(52) U.S. Cl. .................. 296/156; 296/164; 296/64; 296/69

(58) Field of Classification Search ............ 296/156, 296/164, 168, 169, 170, 174, 64, 69, 190.02
See application file for complete search history.

(56) References Cited

U.S. PATENT DOCUMENTS

| | | | | |
|---|---|---|---|---|
| 1,392,955 A | * | 10/1921 | Martin | 296/156 |
| 1,910,166 A | * | 5/1933 | Hoyme | 296/64 |
| 3,165,350 A | * | 1/1965 | Willson | 296/156 |
| 3,567,272 A | * | 3/1971 | Low | 296/156 |
| 3,984,140 A | * | 10/1976 | Robertson | 296/156 |
| 4,505,509 A | * | 3/1985 | Simeri et al. | 296/63 |
| 4,550,946 A | * | 11/1985 | Hanemaayer | 296/156 |
| 4,685,719 A | * | 8/1987 | Hanemaayer | 296/156 |
| 5,639,141 A | * | 6/1997 | Hanemaayer | 296/156 |
| 5,697,666 A | * | 12/1997 | Hanemaayer | 296/164 |
| 6,899,375 B2 | * | 5/2005 | Sankrithi et al. | 296/156 |
| 6,983,979 B2 | * | 1/2006 | Rasmussen | 296/156 |
| 6,988,760 B2 | * | 1/2006 | Rasmussen | 296/156 |
| 7,121,612 B2 | * | 10/2006 | Rasmussen | 296/156 |
| 7,121,613 B1 | * | 10/2006 | Rasmussen | 296/156 |
| 2004/0262946 A1 | * | 12/2004 | Rasmussen | 296/156 |
| 2006/0066131 A1 | * | 3/2006 | Nebel | 296/156 |

* cited by examiner

*Primary Examiner*—Dennis H Pedder
*Assistant Examiner*—Greg Blankenship
(74) *Attorney, Agent, or Firm*—Zarian Midgley & Johnson PLLC

(57) ABSTRACT

A recreational vehicle is disclosed, comprising a plurality of wheels configured to enable the recreational vehicle to roll along the ground, an interior living space enclosed by a plurality of walls, and a generally U-shaped seating area. In some embodiments, the generally U-shaped seating area may comprise two side couches and an interior couch that utilizes a lower mattress as a seat cushion. An exterior couch may face opposite the interior couch and also utilize the lower mattress as a seat cushion. In some embodiments, the recreational vehicle also comprises tracks for elevating the lower mattress and an upper mattress, and elevated table mounts attached to the bottom of the upper mattress that may be used to store one or more table tops below the upper mattress.

9 Claims, 5 Drawing Sheets

RECREATIONAL VEHICLE WITH U-SHAPED SEATING AREA

BACKGROUND

Recreational vehicles have become increasingly popular among people who wish to retain the comforts and conveniences of home while spending extended periods of time away from home. Recreational vehicles, such as motor homes, fifth wheel trailers, and travel trailers, provide an enclosed interior living space and shelter for individuals who are traveling away from home. In some configurations, recreational vehicles may include amenities such as a bed, a bathroom with a sink and flushing toilet, a kitchen with a stove and sink, and a living area with chairs and television cabinets. Recreational vehicles can be parked at a wide variety of locations so that users can enjoy the amenities of the recreational vehicle at their favorite location. Thus, persons using recreational vehicles can enjoy a comfortable living environment at their preferred destination without having to rely on the availability of hotels.

Living space within recreational vehicles can be at a premium. Seating, in particular, can be scarce with a medium-size or larger family or other group of people. Some manufacturers of recreational vehicles have responded to demands for increased space by creating expandable rooms. However, it is preferable to utilize the existing space available inside a recreational vehicle to maximize the available seating within the recreational vehicle.

SUMMARY

The above-mentioned drawbacks associated with existing recreational vehicles are addressed by embodiments of the present application, which will be understood by reading and studying the following specification.

One embodiment of the present application is a recreational vehicle comprising a plurality of wheels configured to enable the recreational vehicle to roll along the ground, an interior living space enclosed by a plurality of walls, and a generally U-shaped seating area.

Another embodiment of the present application is a recreational vehicle comprising a plurality of wheels configured to enable the recreational vehicle to roll along the ground, an interior living space enclosed by a plurality of walls, and a mattress in the living space. The mattress may be configured to be secured to at least one cushion to form a couch facing toward a front end of the recreational vehicle.

Another embodiment of the present application is a recreational vehicle comprising a plurality of wheels configured to enable the recreational vehicle to roll along the ground, an interior living space enclosed by a plurality of walls, a mattress in the living space, tracks for elevating the mattress above the floor, and at least two elevated table mounts attached to the bottom of the mattress.

These and other embodiments of the present application will be discussed more fully in the detailed description. The features, functions, and advantages can be achieved independently in various embodiments of the present application, or may be combined in yet other embodiments.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
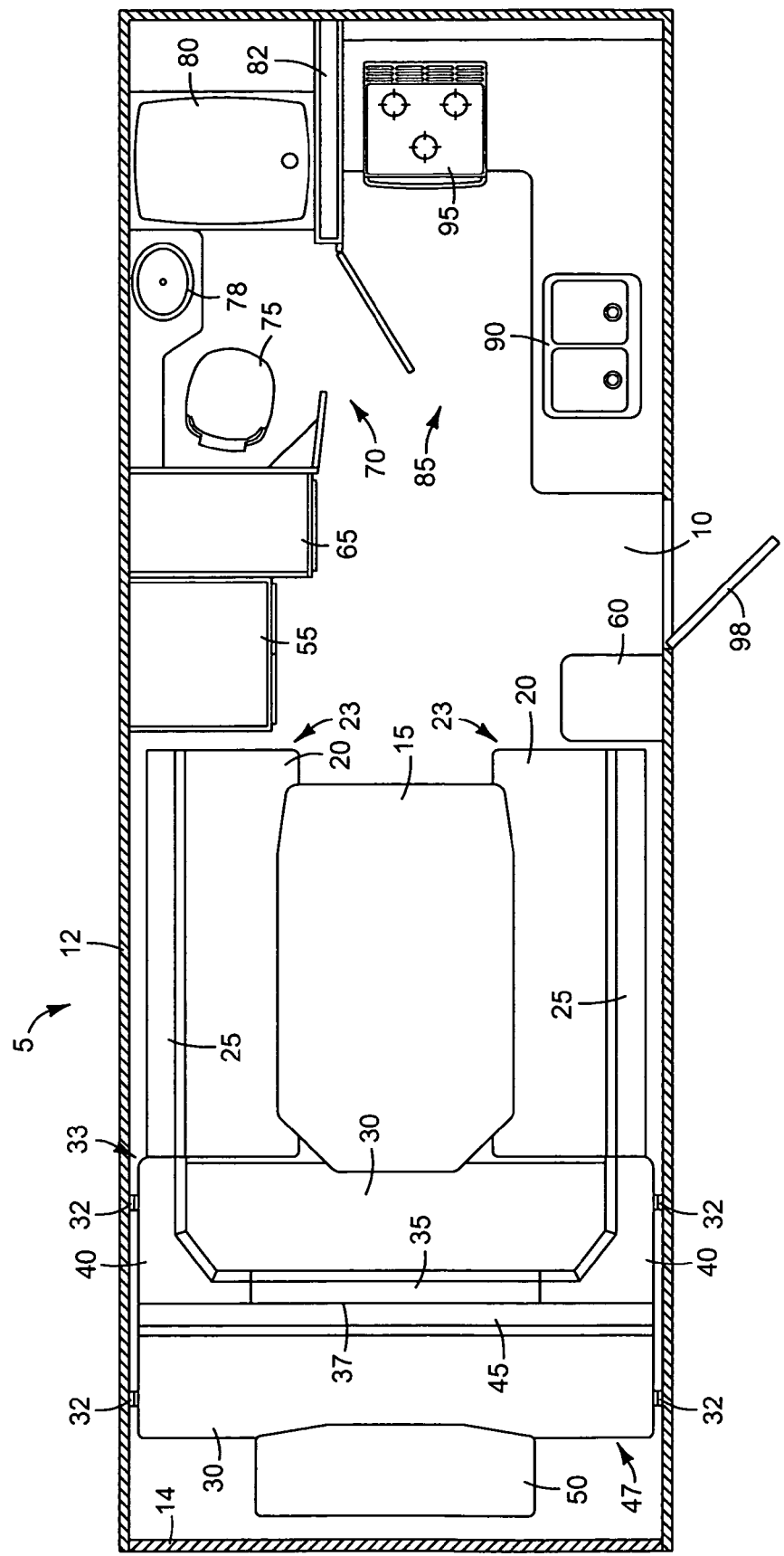
FIG. 1 shows a floor plan of a recreational vehicle.

FIG. 1 shows a floor plan of one exemplary embodiment of a recreational vehicle 5. Many floor plans could be used and still achieve the benefits of the present application. However, the floor plan shown in FIG. 1 will be discussed for illustrative purposes. In the illustrated embodiment, the interior of the recreational vehicle 5 is contained within two side walls 12 and comprises a first television cabinet 55, a second television cabinet 60, a wardrobe 64, a bathroom 70, and a kitchen 85. The bathroom 70 comprises a flushable toilet 75, a sink 78, and a bathtub 80 or shower. The bathroom 70 is partially separated from the kitchen 85 by a bathroom wall 82. The kitchen 85 comprises a sink 90 and a stove 95. These features advantageously enable users to enjoy the amenities of home while traveling.

Figure 2:
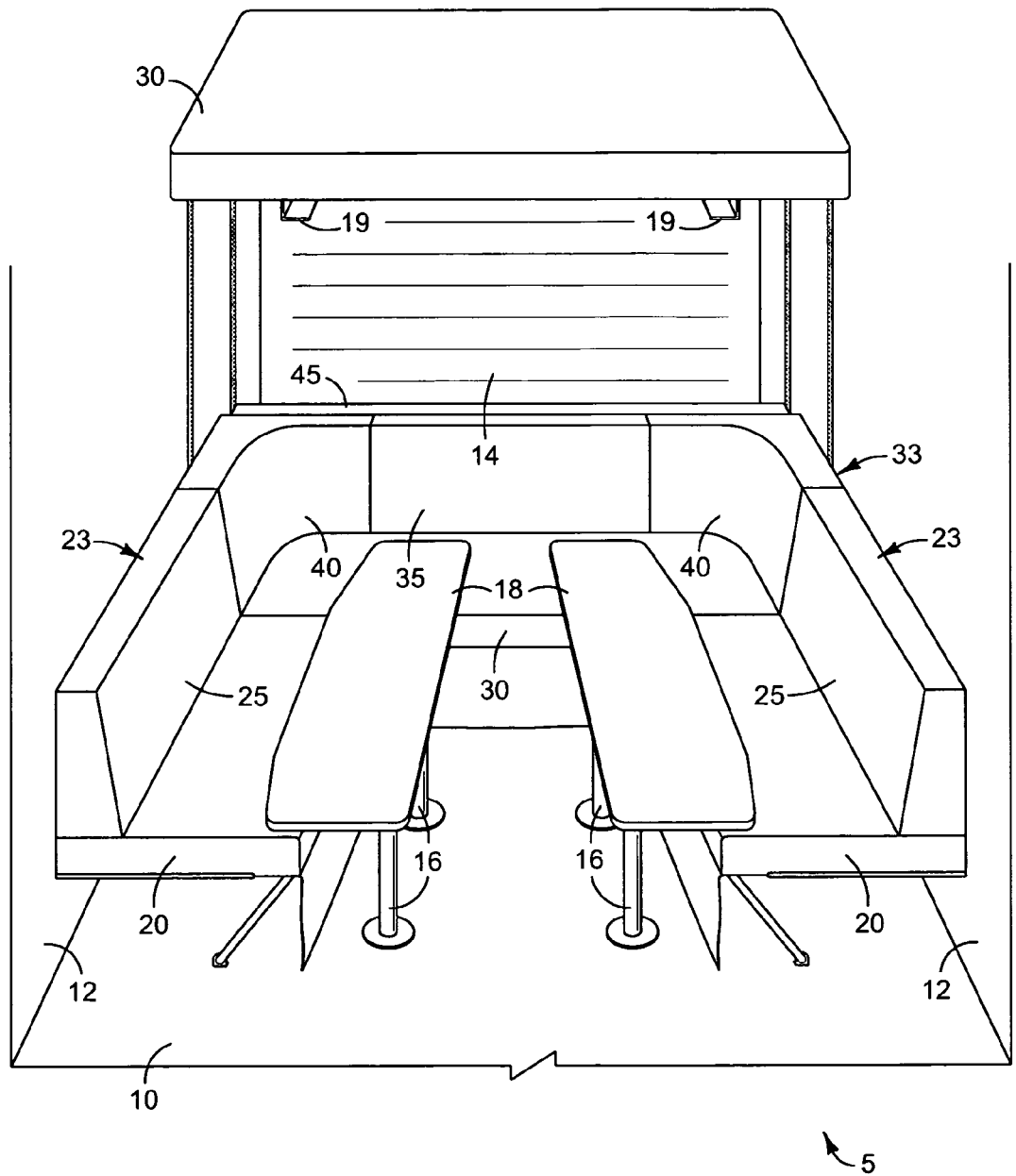
FIG. 2 shows an interior perspective view of the recreational vehicle of FIG. 1 with a generally U-shaped interior seating area.

The rear end of the recreational vehicle 5 may be used as a living area where people may sit and enjoy social activities, such as eating, playing cards, watching television, etc. Frequently, one or more tables are beneficial for these activities, as are chairs and couches. In the embodiment shown in FIG. 1, the living area comprises an interior table top 15 resting on a plurality of legs 16 (shown in FIGS. 2 and 3), two side couches 23, and upper and lower mattresses 30. Twin table tops 18 may be substituted for the single interior table top 15, as shown in FIG. 2.

Each side couch 23 comprises a side couch seat cushion 20 and a side couch back cushion 25, and a back portion that is in contact with one of the side walls 12. The legs 16 may be secured to either the interior table top 15 or the twin table tops 18 and to the floor 10 using a wide variety of well-known techniques, such as friction fit, bolts, screws, or other fasteners.

In some embodiments, the upper and lower mattresses 30 rest on platforms attached to a system of tracks 32 configured to raise and lower the mattresses. In the illustrated embodiments, the recreational vehicle 5 comprises two tracks 32 on each side wall 12, for a total of four tracks 32. As shown in FIGS. 1 and 2, the lower mattress 30 can be lowered to the height of the side couch seat cushions 20 and subdivided by a partition 37 to form an interior couch 33 facing toward the front of the recreational vehicle 5 and an exterior couch 47 facing toward the rear of the recreational vehicle 5.

In this configuration, the exterior couch 47 comprises a rear portion of the lower mattress 30 and an exterior couch back cushion 45. The interior couch 33 comprises a front portion of the lower mattress 30, an interior couch back cushion 35, and two interior couch corner cushions 40. In some embodiments, the exterior couch back cushion 45 and interior couch back cushion 35 are attached to opposing sides of the partition 37, which can be secured to the lower mattress 30 using a variety of well-known techniques, such as, for example, removable brackets or rotatable brackets that allow the partition 37 to rotate off the top of the lower mattress 30. The partition 37 divides the interior couch 33 from the exterior couch 47. A pedestal table 50 may rest in front of the exterior couch 47.

FIG. 2 shows an interior perspective view of the rear portion of the living area described above. As shown in FIGS. 1 and 2, the interior couch 33 and two side couches 23 form a continuous U-shaped seating area surrounding the interior table top 15 or twin table tops 18 on three sides. The side couch back cushions 25, interior couch corner cushions 40, and interior couch back cushion 35 form a continuous back cushion surrounding the U-shaped seating area, similar to a booth seating arrangement available in some restaurants. Similarly, the side couch seat cushions 20 and front portion of the mattress 30 form a continuous, U-shaped bottom cushion.

In some embodiments, the interior couch corner cushions 40 are each in contact with the interior couch back cushion 35 and with the side couch back cushions 25. The interior couch corner cushions 40 may be secured to the interior couch back cushion 35 and to the side couch back cushions 25 using a wide variety of suitable techniques, such as friction fit, Velcro® straps, buttons, snaps, locks, hooks, or other fasteners.

Figure 3:
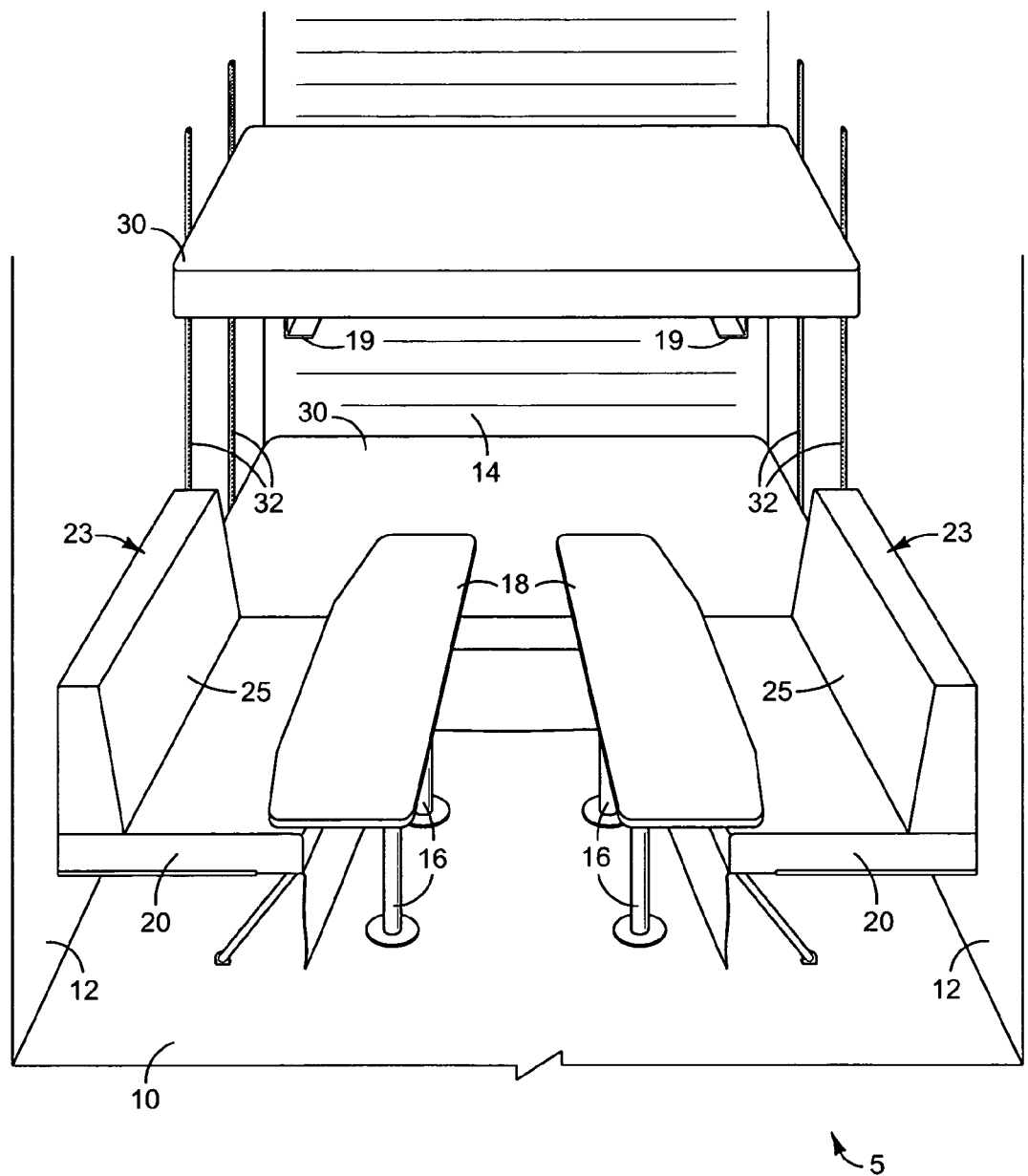
FIG. 3 shows an interior perspective view of the recreational vehicle of FIGS. 1 and 2 with a bed in place of the interior couch.

As described above, the partition 37 to which the interior couch back cushion 35 and exterior couch back cushion 45 are attached may be slid away, rotated away, or otherwise removed from the lower mattress 30. The interior couch corner cushions 40 may also be removed to clear the lower mattress 30, making it available for use as a double bed, as shown in FIG. 3. The interior couch back cushions 35, interior couch corner cushions 40, and exterior couch back cushion 45 may be stored in a variety of suitable locations, such as, for example, under the lower mattress 30.

Figure 4:
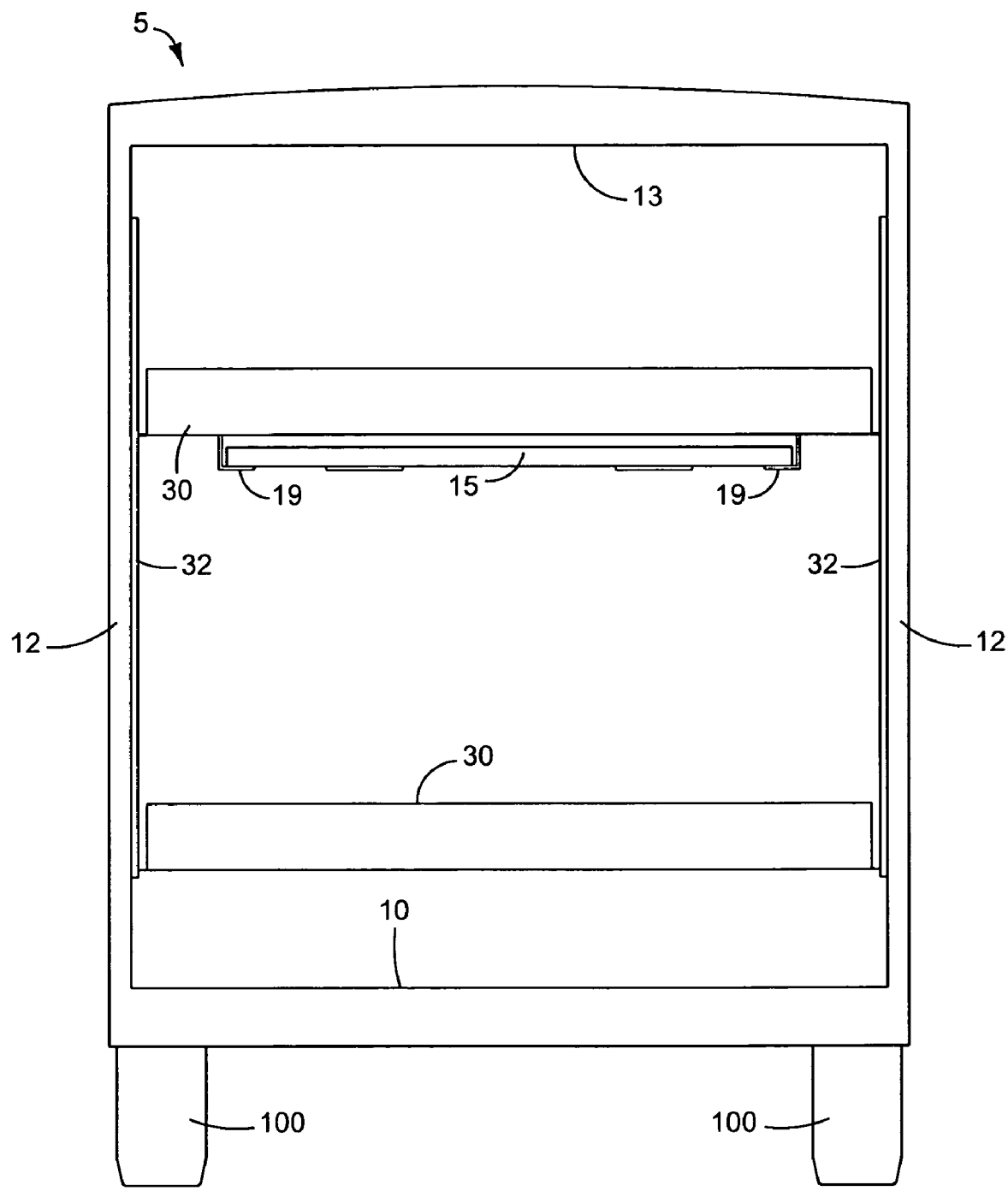
FIG. 4 shows an interior perspective view of the recreational vehicle of FIGS. 1-3 with elevated table mounts holding an interior table top below the mattress.

The recreational vehicle 5 may further comprise elevated table mounts 19 configured to store the interior table top 15, twin table tops 18, and/or pedestal table top 50 when not in use. The elevated table mounts 19 may be attached to the upper mattress 30, as shown in FIGS. 2 through 4, or may be attached to the tracks 32. In the illustrated embodiment, the elevated table mounts 19 each comprise a generally horizontal top surface facing up, on which the table top(s) 15, 18, 50, may rest, and a non-horizontal portion between the table top(s) 15, 18, 50, and the tracks 32.

The table top(s) 15, 18, 50, may be stored on the elevated table mounts 19 by lifting the table top(s) 15, 18, 50, and sliding the ends thereof onto the generally horizontal top surfaces of the elevated table mounts 19. When stored on the elevated table mounts 19, the table top(s) 15, 18, 50, may be secured in place using a wide variety of suitable techniques, such as, for example, friction fit, straps, locks, hooks, or other fasteners, to reduce or substantially eliminate any undesired sliding or other motion while the recreational vehicle 5 is in transit.

Figure 5:
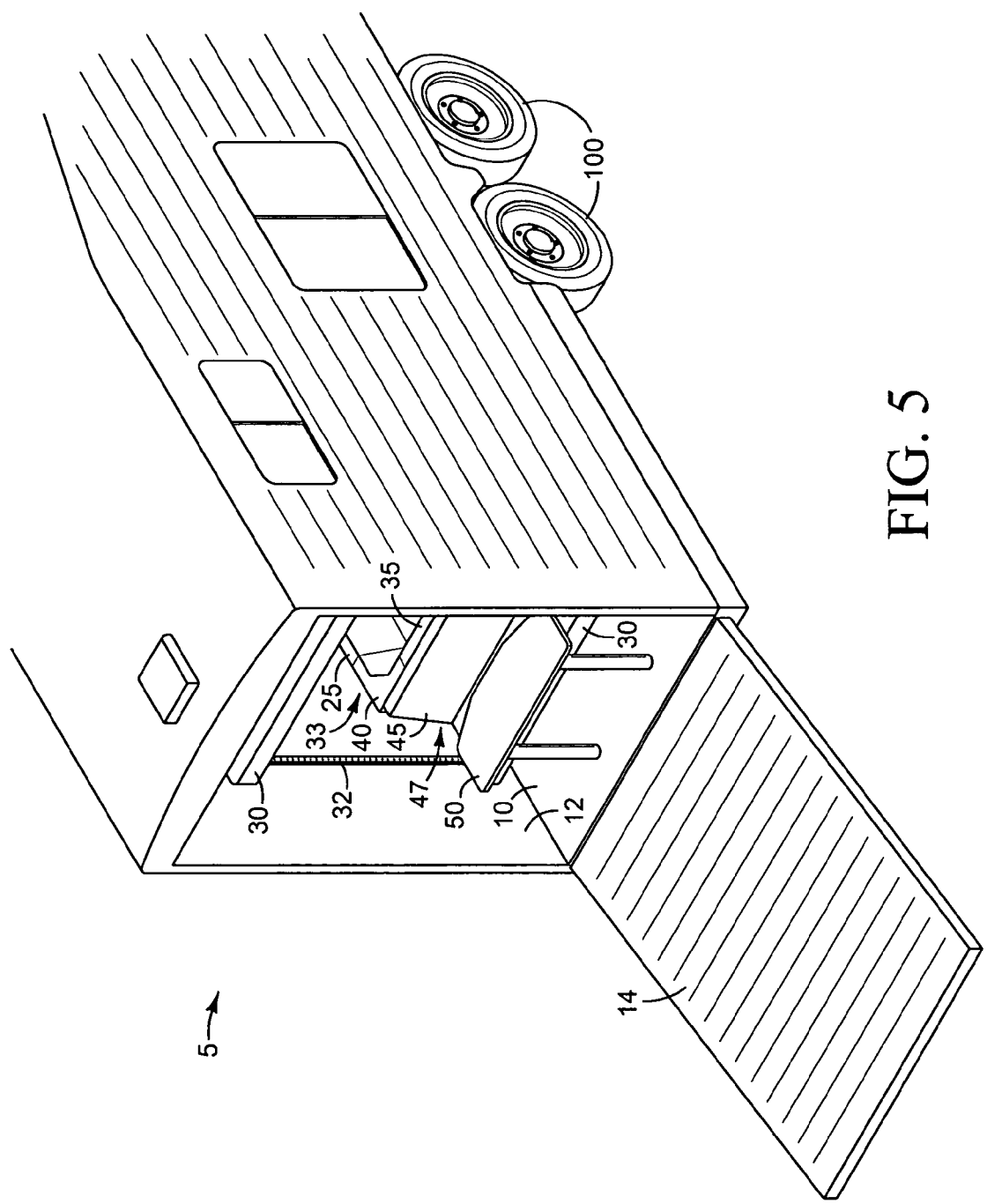
FIG. 5 shows an exterior perspective view of the recreational vehicle of FIGS. 1-4 with the ramp extended to show the rear interior of the recreational vehicle.

FIG. 5 shows an outside perspective view of an embodiment of a recreational vehicle 5 from the rear. In the illustrated embodiment, the recreational vehicle 5 comprises a plurality of wheels 100 which are configured to enable the recreational vehicle 5 to roll along the ground. The recreational vehicle 5 further comprises a ramp 14, which is connected to the recreational vehicle 5 at a rear end of the floor 10 by hinges or other suitable mechanisms that allow the ramp 14 to rotate using a rear end portion of the recreational vehicle 5 as a fulcrum point.

In operation, the ramp 14 is rotated so that an end of the ramp 14 that was previously near the ceiling 13 of the recreational vehicle 5 touches the ground. As illustrated in FIGS. 4 and 5, with the ramp 14 in an extended position touching the ground, the lower mattress 30 and exterior couch back cushion 45 can be used as an exterior couch 47 facing outward, in conjunction with the pedestal table 50, if desired. Alternatively, the tracks 32 can be used to lift the mattresses 30 from a lowered position useful for sitting or sleeping to a raised position useful for loading and unloading objects, such as vehicles (e.g., motorcycles, ATVs, personal watercraft, etc.), equipment, and gear, via the ramp 14.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A recreational vehicle comprising:
   a plurality of wheels configured to enable the recreational vehicle to roll along a ground;
   an interior living space enclosed by a plurality of walls; and
   a mattress in the living space;
   wherein the mattress is configured to be secured to at least one cushion to form an interior couch facing toward a front end of the recreational vehicle, and
   wherein the mattress is configured to be secured to an interior couch back cushion, to two interior couch corner cushions, and to an exterior couch back cushion, to form:
      the interior couch facing toward the front end of the recreational vehicle; and
      an exterior couch facing toward a rear end of the recreational vehicle.

2. The recreational vehicle of claim 1 further comprising:
   a second couch and a third couch;
   wherein the second couch and third couch are each in contact with the mattress and with one of the plurality of walls; and
   wherein the second couch and third couch face each other in opposite directions.

3. The recreational vehicle of claim 2 wherein the mattress, second couch, and third couch are configured to come together to form a generally U-shaped seating area.

4. The recreational vehicle of claim 1 further comprising:
   a first side couch and a second side couch;
   wherein the first side couch and second side couch are each in contact with one of the plurality of walls and with the mattress; and
   the mattress is configured to form a generally U-shaped seating area comprising the first side couch, interior couch, and second side couch.

5. The recreational vehicle of claim 4 further comprising:
   at least two elevated table mounts below the mattress;

wherein each of the at least two elevated table mounts comprises:
a generally horizontal top surface portion facing up toward a ceiling of the recreational vehicle; and
a non-horizontal portion.

6. The recreational vehicle of claim 1 wherein the mattress is held above a floor of the recreational vehicle by tracks;
wherein the tracks are configured to elevate the mattress; and
the recreational vehicle further comprises at least two elevated table mounts attached to a bottom side of the mattress.

7. The recreational vehicle of claim 6 wherein each of the at least two elevated table mounts comprises a generally horizontal top surface portion facing up toward a ceiling of the recreational vehicle and a non-horizontal portion.

8. The recreational vehicle of claim 1 further comprising:
a generally U-shaped seating area facing toward a front portion of the recreational vehicle;
wherein the generally U-shaped seating area comprises a first seat cushion;
wherein the exterior couch comprises a second seat cushion;
wherein a portion of the first seat cushion comprises a first portion of the mattress; and
wherein a portion of the second seat comprises a second portion of the mattress.

9. The recreational vehicle of claim 8, further comprising a partition, wherein the partition comprises a back cushion of the generally U-shaped seating area and a back cushion of the exterior couch.

* * * * *